United States Patent
Henley et al.

(10) Patent No.: US 10,585,256 B1
(45) Date of Patent: Mar. 10, 2020

(54) TERMINAL OF AN OPTICAL FIBER NETWORK HAVING A BYPASS MODULE

(71) Applicant: CORNING RESEARCH & DEVELOPMENT CORPORATION, Corning, NY (US)

(72) Inventors: Joshua David Henley, Fort Worth, TX (US); Trampus Lee Landrum, Hickory, NC (US); Diana Rodriguez, Fort Worth, TX (US)

(73) Assignee: Corning Research & Development Corporation, Charlotte, NC (US)

( * ) Notice: Subject to any disclaimer, the term of this patent is extended or adjusted under 35 U.S.C. 154(b) by 0 days.

(21) Appl. No.: 16/369,672

(22) Filed: Mar. 29, 2019

(51) Int. Cl.
  *G02B 6/44* (2006.01)
  *H01R 13/639* (2006.01)
  *G02B 6/38* (2006.01)

(52) U.S. Cl.
  CPC ......... *G02B 6/4452* (2013.01); *G02B 6/3807* (2013.01); *H01R 13/639* (2013.01)

(58) Field of Classification Search
  None
  See application file for complete search history.

(56) References Cited

U.S. PATENT DOCUMENTS

| | | | |
|---|---|---|---|
| 5,497,444 A * | 3/1996 | Wheeler | G02B 6/4452 385/134 |
| 7,256,172 B1 | 8/2007 | Cocks et al. | |
| 7,406,242 B1 * | 7/2008 | Braga | G02B 6/4453 385/134 |
| 7,526,174 B2 | 4/2009 | Leon et al. | |
| 8,380,036 B2 | 2/2013 | Smith | |
| 8,385,711 B2 | 2/2013 | Fabrykowski et al. | |
| 8,428,418 B2 | 4/2013 | Smrha | |
| 8,520,997 B2 | 8/2013 | Zimmel | |
| 2008/0124038 A1 * | 5/2008 | Kowalczyk | G02B 6/444 385/135 |
| 2009/0103879 A1 * | 4/2009 | Tang | G02B 6/4452 385/135 |
| 2011/0123165 A1 * | 5/2011 | Barth | G02B 6/4452 385/135 |
| 2011/0211799 A1 * | 9/2011 | Conner | G02B 6/4471 385/135 |
| 2011/0274403 A1 * | 11/2011 | LeBlanc | G02B 6/4452 385/135 |

(Continued)

FOREIGN PATENT DOCUMENTS

JP          3-245109 A   * 10/1991

*Primary Examiner* — Michael Stahl
(74) *Attorney, Agent, or Firm* — Grant A. Gildehaus

(57) ABSTRACT

A terminal for an optical fiber network includes a housing, a plurality of feeder cable adapters positioned in the housing, a plurality of distribution panel adapters positioned in the housing, and a bypass module positioned in the housing and including at least one bypass module adapter. A plurality of input optical fibers extend from at least one of the plurality of feeder cable adapters, into the main body of the bypass module, and to the at least one bypass module adapter. Additionally, a plurality of output optical fibers extend from the at least one bypass module adapter to at least one of the plurality of distribution panel adapters. The plurality of input optical fibers each optically couple to a single one of the plurality of output optical fibers within the at least one bypass module adapter.

22 Claims, 8 Drawing Sheets

(56) References Cited

U.S. PATENT DOCUMENTS

| | | | |
|---|---|---|---|
| 2012/0063735 A1* | 3/2012 | Nair | G02B 6/4446 385/135 |
| 2013/0230291 A1* | 9/2013 | Lichoulas | G02B 6/4452 385/135 |
| 2014/0023334 A1* | 1/2014 | Larsson | G02B 6/445 385/135 |
| 2014/0314384 A1 | 10/2014 | Nair et al. | |
| 2015/0063772 A1* | 3/2015 | Beamon | G02B 6/4471 385/135 |
| 2015/0093088 A1* | 4/2015 | Matz | G02B 6/4446 385/135 |
| 2015/0110442 A1 | 4/2015 | Zimmel et al. | |
| 2015/0260936 A1* | 9/2015 | Newbury | G02B 6/4471 385/135 |
| 2015/0355428 A1 | 12/2015 | Leeman et al. | |
| 2016/0011391 A1 | 1/2016 | Montalvo Urbano et al. | |
| 2017/0212321 A1* | 7/2017 | Gronvall | G02B 6/4452 |
| 2017/0322384 A1* | 11/2017 | Burkett | G02B 6/3897 |
| 2018/0074277 A1* | 3/2018 | Marcouiller | G02B 6/4471 |
| 2018/0246289 A1* | 8/2018 | Amaya Cruz | G02B 6/3897 |
| 2019/0129116 A1* | 5/2019 | Henley | G02B 6/4453 |

* cited by examiner

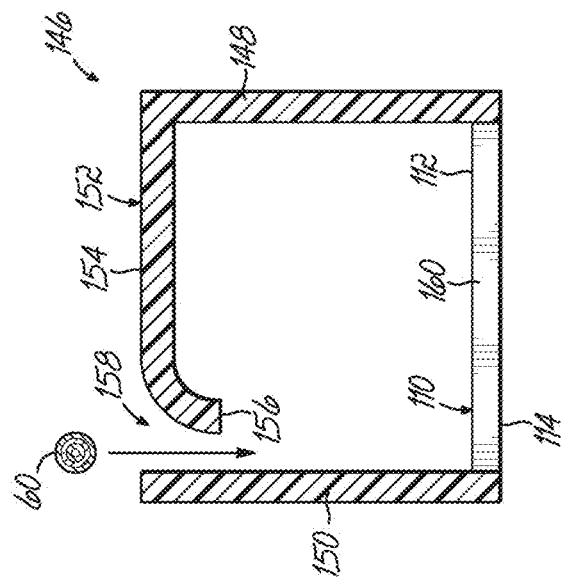
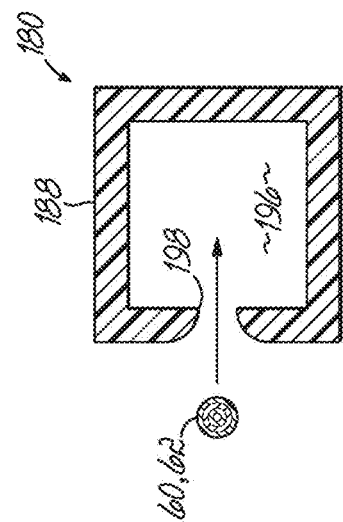
FIG. 5B
FIG. 5A

TERMINAL OF AN OPTICAL FIBER NETWORK HAVING A BYPASS MODULE

FIELD

This disclosure relates generally to optical connectivity, and more particularly to a terminal of an optical fiber network having a bypass module that provides for selective connection between input and output optical fibers without splitting the optical signal.

BACKGROUND

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a local convergence point, network access point, subscriber premise, or something else, fiber optic equipment is used to house components that carry out one or more of the tasks. The term "terminal" will be used in this disclosure to generically refer to such equipment, which may include fiber distribution hubs (FDH), cabinets, closures, network interface devices, etc. In many current network architectures, terminals at local convergence points 18 are configured to split the signal in each of the optical fibers carried in the feeder cable 16 (referred to as feeder optical fibers for terminal 30). The feeder optical fibers of the feeder cable 16 are routed to one or more splitter modules carried in the terminal 30 where the optical signal in the feeder optical fibers is split between a plurality of output fibers. By way of example, the splitter module may be configured to split the incoming optical signal between 2 and 32 times. The output fibers of the splitter module are then coupled to a dedicated distribution cable 20 in the terminal 30 for distribution to subscriber premises 14. The optical signal carried by any one of the distribution cables 20 is a split version of the optical signal carried by an optical fiber of the feeder cable 16.

While current network architectures with terminals 30 as described above adequately meet current demands for end subscribers, service providers continually seek improved network architectures that provide greater flexibility in the optical fiber network. As the demand for bandwidth from end subscribers continues to increase, the ability to provide a terminal (such as at a local convergence point 18) capable of servicing all the different types of end subscribers (e.g., homes, apartments, business, etc.) from that terminal may become increasingly difficult. For example, the ability for current terminals to serve both a residential neighborhood and a large office complex may not be feasible as demand increases. This may be due in part to the fact that current terminal designs are configured to split the optical signal from each of the optical fibers of the feeder cable 16. Thus, the output optical signals carried by the distribution cables 20 are attenuated or modified compared to the more powerful optical signals carried by the feeder cable 16, and this may limit the ability of the terminal to service the different types of end subscribers in the vicinity of the terminal.

SUMMARY

A terminal for an optical fiber network that includes a feeder cable carrying feeder optical fibers and a plurality of distribution cables carrying distribution optical fibers is disclosed. The terminal includes a housing configured to receive respective end sections of the feeder cable and the plurality of distribution cables, a plurality of feeder cable adapters positioned in the housing for securing ends of the feeder optical fibers, a plurality of distribution panel adapters positioned in the housing for securing ends of the distribution optical fibers, and a bypass module positioned in the housing. The bypass module includes a main body and at least one bypass module adapter secured to the main body. The at least one bypass module adapter defines a first side having at least one input port and a second side having at least one output port. The terminal further includes a plurality of input optical fibers extending from at least one of the plurality of feeder cable adapters, into the main body of the bypass module, and to the at least one input port on the first side of the at least one bypass module adapter, and a plurality of output optical fibers extending from the at least one output port on the second side of the at least one bypass module adapter to at least one of the plurality of distribution panel adapters. The plurality of input optical fibers each optically couple to a single one of the plurality of output optical fibers within the at least one bypass module adapter.

In an exemplary embodiment, the first side of the at least one bypass module adapter has a plurality of input ports and the second side of the at least one bypass module adapter has a corresponding plurality of output ports. The plurality of input optical fibers each extend to a respective one of the plurality of input ports, and wherein the plurality of output optical fibers each extend from a respective one of the plurality of output ports. In a further embodiment, the terminal further includes a plurality of input cables that each carry one of the plurality of input optical fibers, wherein each of the plurality of input cables includes a first end secured to one of the plurality of input ports of the at least one bypass module adapter and a second end secured to one of the plurality of feeder cable adapters, and a plurality of output cables that each carry one of the plurality of output optical fibers, wherein each of the plurality of output cables includes a first end secured to one of the plurality of output ports of the at least one bypass module adapter and a second end secured to one of the plurality of distribution panel adapters.

In one embodiment, the bypass module further includes an adapter frame for securing the at least one bypass module adapter to the main body of the bypass module. The bypass module further includes at least one cable guide for arranging the plurality of input optical fibers or the plurality of output optical fibers on the main body of the bypass module. The at least one cable guide may include a guide channel receiving the plurality of input optical fibers, wherein the guide channel includes a pair of opposed walls that define the channel. The pair of opposed walls of the guide channel may be arcuate to facilitate a smooth change in direction of the plurality of input optical fibers. Additionally, the bypass module may further include a retaining tab for retaining the plurality of input optical fibers in the guide channel.

In another embodiment, the at least one cable guide may include one or more cable supports for supporting the plurality of input optical fibers, wherein each of the one or more cable supports includes an arcuate wall to facilitate a smooth change in direction of the plurality of input optical fibers. The arcuate wall of the one or more cable supports may have a radius of curvature between about 2 cm and about 6 cm. Moreover, the one or more cable supports may be positioned on the main body to at least partially define a cable support channel for receiving one or more of the plurality of input optical fibers. Additionally, the bypass module may further include a retaining tab for retaining the one or more of the plurality of input optical fibers in the cable support channel. The adapter frame may define one or more adapter groups, and there may be a cable support for each adapter group in the adapter frame. By way of example, each adapter group may be configured to include between 1-6 bypass module adapters.

In a further embodiment, the at least one cable guide may include a pair of guide tips for guiding the plurality of input optical fibers and the plurality of output optical fibers. Each guide tip may include a leg and a head that defines a head channel. The guide tips may be selectively mountable on the main body of the bypass module and may be flexible in an exemplary embodiment. Additionally, the head of each guide tip may include a slot for providing access to the head channel. Furthermore, the bypass module may further include at least one strain relief device for minimizing damage to the plurality of input optical fibers. In one embodiment, the strain relief device may include a cable cinch.

In one embodiment, the bypass module further includes a handle movable between an opened position and a closed position. The handle is configured such that when the handle is in the opened position, an access path is provided for accessing the at least one output port of the at least one bypass module adapter, and when the handle is in the closed position, the access path to the at least one output port of the at least one bypass module adapter is blocked off. The bypass module may further include at least one locking mechanism for securing the handle in the opened position or the closed position. For example, in one embodiment the bypass module includes two locking mechanism for securing the handle in the opened position and the closed position.

In one embodiment, the bypass module is one of a plurality of bypass modules positioned in the housing, wherein each of the plurality of bypass modules has a similar construction. In this embodiment, the plurality of input optical fibers includes groups of the input optical fibers, wherein each group of the plurality of input optical fibers is associated with a respective one of the plurality of bypass modules, and the plurality of output optical fibers includes groups of the output optical fibers, wherein each group of the plurality of output optical fibers is associated with a respective one of the plurality of bypass modules.

In one embodiment, in addition to the bypass module, the terminal may include a splitter module positioned in the housing for splitting the optical signal in a feeder optical fiber. The splitter module includes a main body and an optical splitter coupled to the main body. An input optical fiber extends from at least one of the plurality of feeder cable adapters to the optical splitter of the splitter module and a plurality of output optical fibers each extend from the optical splitter to at least one of the plurality of distribution panel adapters.

In another embodiment, a terminal for an optical fiber network includes a housing; a plurality of feeder cable adapters positioned in the housing; a feeder cable having an end section extending into the housing, wherein the feeder cable includes a plurality of feeder optical fibers each having an end secured in one of the feeder cable adapters; a plurality of distribution panel adapters positioned in the housing; a plurality of distribution cables having respective end sections extending into the housing, wherein each of the distribution cables includes at least one distribution optical fiber having an end section secured in a respective one of the distribution panel adapters; and a bypass module positioned in the housing. The bypass module includes a main body and at least one bypass module adapter secured to the main body. The terminal may further include a plurality of input optical fibers extending from at least one of the feeder cable adapters, into the main body of the bypass module, and to respective input ports on a first side of the at least one bypass module adapter, wherein each of the input optical fibers is optically coupled to one of the feeder optical fibers in one or more of the feeder cable adapters. Moreover, the terminal may further include a plurality of output optical fibers extending from respective output ports on a second side of the at least one bypass module adapter and to at least one of the distribution panel adapters. The plurality of output optical fibers each optically couple to: (a) a respective one of the distribution optical fibers in one or more of the distribution panel adapters, and (b) to a respective one of the plurality of input optical fibers in the at least one bypass module adapter.

In yet another embodiment, a bypass module for a terminal of an optical fiber network includes a main body defining a base having a base opening, an adapter frame on the base and positioned adjacent the base opening, at least one bypass module adapter coupled to the adapter frame and defining a first side having a plurality of input ports and a second side having a corresponding plurality of output ports, and at least one cable guide on the base. The bypass module may further include a plurality of input optical fibers each extending through the base opening and being guided from the base opening to a respective one of the plurality of input ports on the first side of the at least one bypass module adapter by the at least one cable guide, wherein the plurality of input optical fibers each include an end secured in the at least one bypass module adapter. Moreover, the bypass module may further include a plurality of output optical fibers each extending from a respective one of the output ports on the second side of the at least one bypass module adapter. The plurality of input optical fibers each optically couple to a single one of the plurality of output optical fibers in the at least one bypass module adapter.

In one embodiment, the at least one cable guide may include a guide channel receiving the plurality of input optical fibers, wherein the guide channel includes a pair of generally arcuate opposed walls that define the channel. The bypass module may further include a retaining tab for retaining the plurality of input optical fibers in the guide channel. In another embodiment, the at least one cable guide may include one or more cable supports for supporting the plurality of input optical fibers, each of the one or more cable supports including an arcuate wall to facilitate a smooth change in direction of the plurality of input optical fibers, wherein the one or more cable supports is positioned on the base to at least partially define a cable support channel for receiving one or more of the plurality of input optical fibers. The bypass module may further include a retaining tab for retaining the one or more of the plurality of input optical fibers in the cable support channel. The adapter frame may define one or more adapter groups and there may be a cable support for each adapter group in the adapter frame.

In a further aspect, the bypass module may further include a pair of generally flexible guide tips selectively mountable on the main body of the bypass module for guiding the plurality of input optical fibers and the plurality of output optical fibers. Each guide tip includes a leg and a head that defines a head channel, and the head of each guide tip may include a slot for providing access to the head channel. In one embodiment, the bypass module further includes a handle movable between an opened position and a closed position. The handle is configured such that when the handle is in the opened position, an access path is provided for accessing the plurality of output ports of the at least one bypass module adapter, and when the handle is in the closed position, the access path to the plurality of output ports of the at least one bypass module adapter is blocked off.

In still a further embodiment, a method of configuring a terminal for an optical fiber network that includes a feeder cable carrying feeder optical fibers and a plurality of distribution cables carrying distribution optical fibers is disclosed. The terminal includes a housing configured to receive respective end sections of the feeder cable and the plurality of distribution cables, a plurality of feeder cable adapters positioned in the housing for securing ends of the feeder optical fibers, and a plurality of distribution panel adapters positioned in the housing for securing ends of the distribution optical fibers. The method includes positioning a bypass module, such as that described above, in the housing, coupling each of the plurality of input optical fibers to one of the feeder cable adapters, and coupling each of the plurality of output optical fibers to one of the distribution panel adapters.

In another embodiment, a method of configuring an optical fiber network is disclosed. The optical fiber network includes a terminal having a housing, a plurality of feeder cable adapters positioned in the housing, a feeder cable having an end section extending into the housing, a plurality of distribution panel adapters positioned in the housing, and a plurality of distribution cables having respective end sections extending into the housing. The feeder cable includes a plurality of feeder optical fibers each having an end secured in one of the feeder cable adapters, and each of the distribution cables includes at least one distribution optical fiber having an end section secured in a respective one of the distribution panel adapters. The method includes positioning the bypass module in the housing, optically coupling at least one of the plurality of input optical fibers to one of the feeder optical fibers within one of the feeder cable adapters, coupling a first end of an output optical fiber to one of the plurality of output ports in the at least one bypass module adapter and coupling a second end of the output optical fiber to one of the distribution panel adapters, wherein the output optical fiber is optically coupled to: (a) the distribution optical fiber in the one distribution adapter, and (b) the at least one of the plurality of input optical fibers.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 5A is a cross-sectional view of the bypass module taken along line 5A-5A of FIG. 5;

FIG. 5B is a cross-sectional view of the bypass module taken along line 5B-5B of FIG. 5;

DETAILED DESCRIPTION

Various embodiments will be further clarified by examples in the description below. In general, the description generally relates to a terminal that provides greater flexibility to service providers by allowing network designers to provide service to different types of end subscribers from the same terminal. By way of example, the terminal may be used in FTTx networks, such as the FTTx network 10 illustrated in FIG. 1, at local convergence points 18 or network access points, or even in enterprise networks, such as in data center environments. Thus, although the components may be described in connection with an exemplary terminal below, this is merely to facilitate discussion. The components may in fact be used in a wide variety of different equipment for all different types of fiber optic networks.

The disclosed terminal provides increased flexibility by providing selective bypass of the signal splitting process that typically occurs in network terminals. For example, the terminal may be designed such that the optical signal for some of the optical fibers of the feeder cable 16 may be split at the terminal and distributed via the optical fibers of the distribution cables 20 to a first type of end subscriber (e.g., residential subscribers), while others of the optical fibers of the feeder cable 16 may have their optical signals bypass the signal splitting process at the terminal such that some of the optical fibers of the distribution cables 20 carry an optical signal from a single one of the optical fibers of the feeder cable 16.

Figure 1:
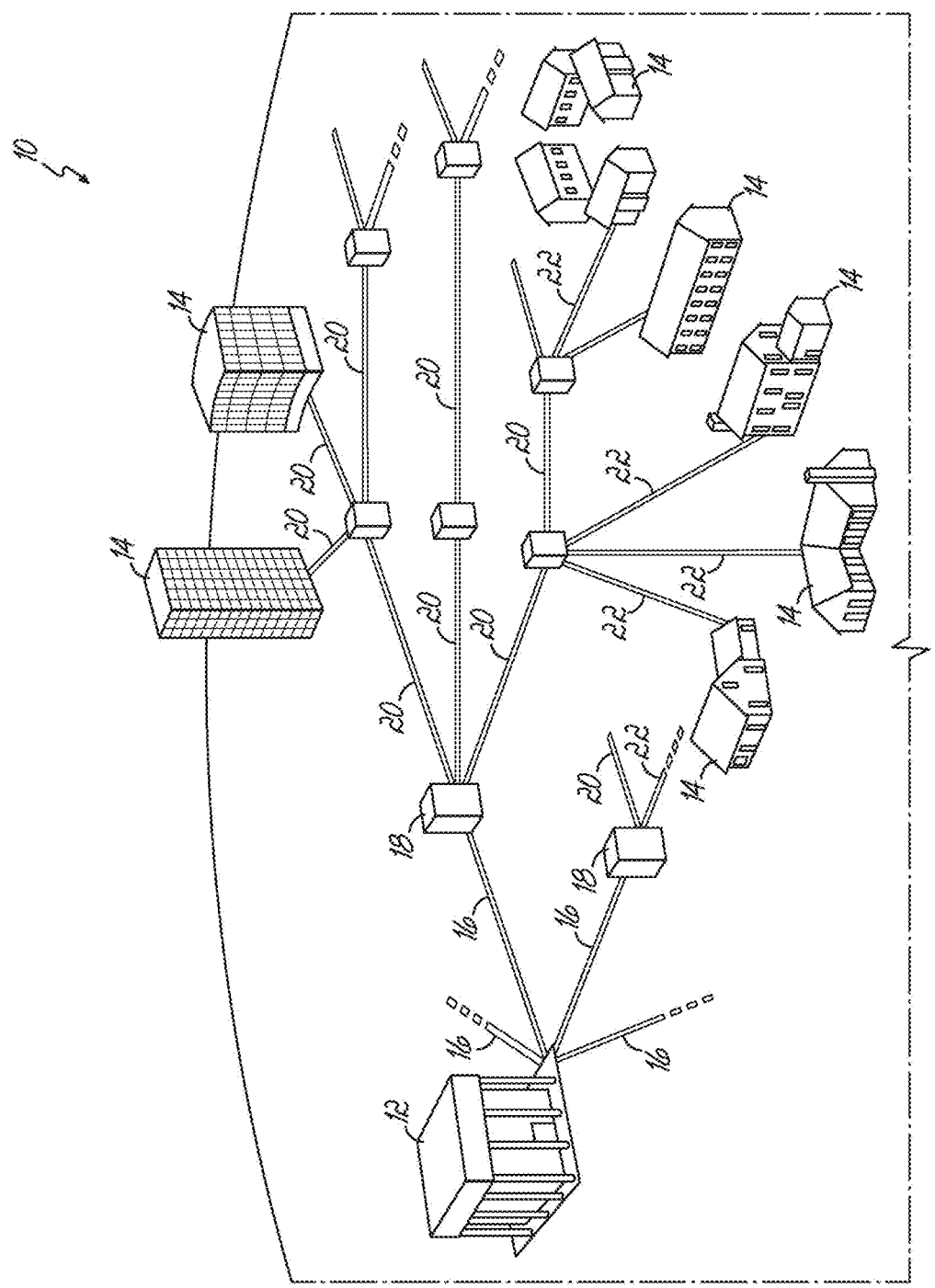
FIG. 1 is a schematic diagram of an exemplary FTTx network.
Figure 2:
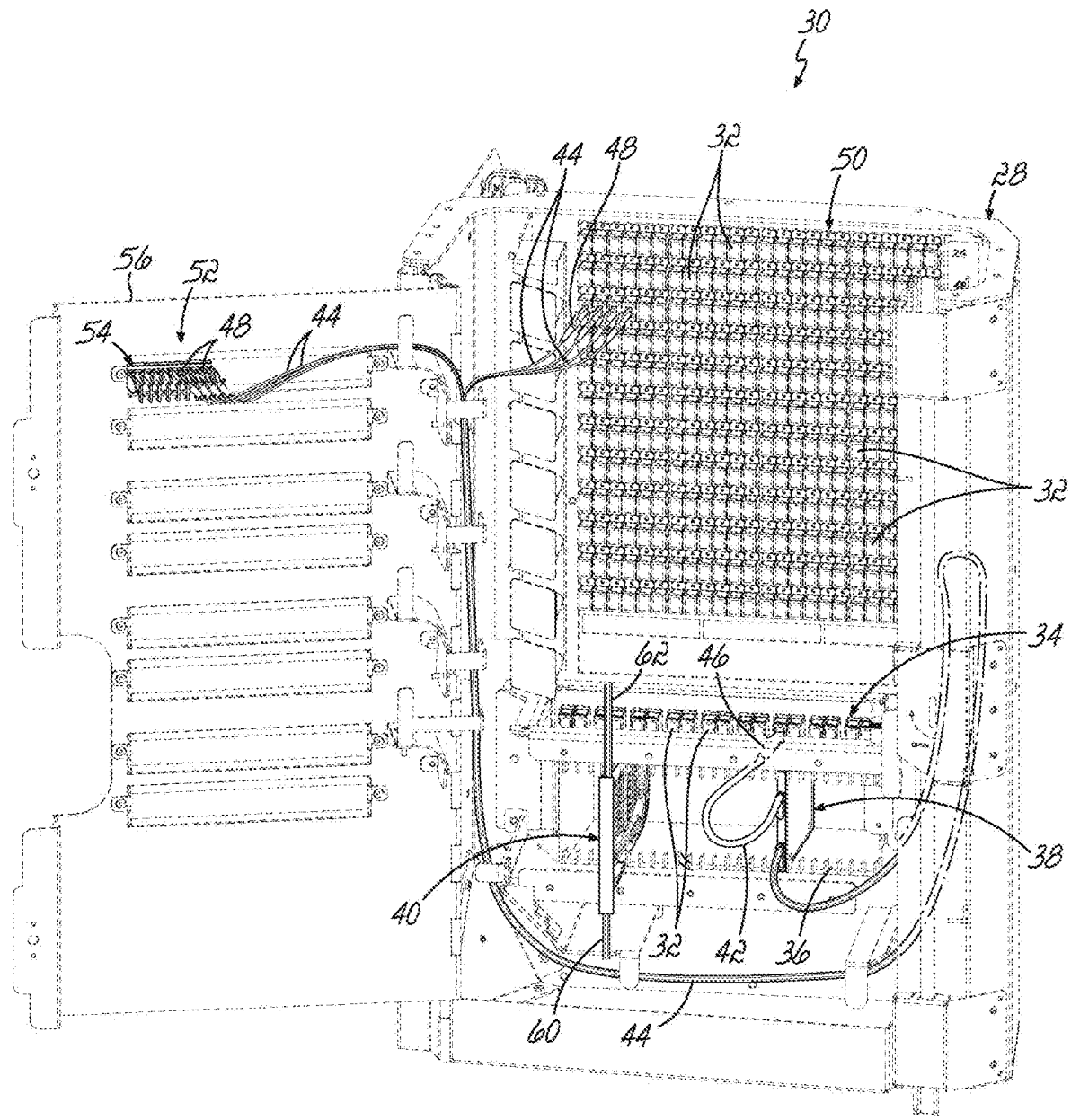
FIG. 2 is a perspective view of one embodiment of a terminal.

With this in mind, FIG. 2 illustrates one example of frame 28 for a terminal 30 to be placed at one of the local convergence points 18 in the optical network 10 of FIG. 1. The terminal 30 may be in the form of a cabinet or enclosure that includes the frame 28 installed in a housing (not shown). The frame 28 supports various components for accomplishing the network tasks associated with the local convergence point 18. For example, a row of fiber optic adapters 32 (referred to as "feeder cable adapters") supported by the frame 28 defines a "feeder field" 34 to receive connections associated with one of the feeder cables 16 of the network 10. In other embodiments, there may be multiple rows of the feeder cable adapters 32 defining the feeder field 34. Optical fibers (not shown) from the feeder cable 16 may be terminated at their ends with fiber optic connectors (directly or by splicing to pigtails) that are plugged into the feeder cable adapters 32 on the back side of the frame 28. These optical fibers carry the input optical signals of the feeder cable 16 to the terminal 30 and are accessible via the feeder cable adapters 32 in the feeder field 34.

Below the feeder field 34, the frame 28 defines one or more slots 36 for receiving and supporting various modules 38, 40 for manipulating the input optical signals from the feeder cable 16 in a desired manner. To enhance the understanding of aspects of the disclosure, only two modules are shown in FIG. 2. It should be appreciated, however, that the frame 28 may include only one module or a plurality of modules which may be the same type or different from each other. In an exemplary embodiment, for example, the first module 38 may be a splitter module configured to split the optical signal from one or more optical fibers of the feeder cable 16 and may include an input cable 42 and a plurality of output cables 44. The input cable 42 carries an input fiber (not shown) and the output cables 44 carry respective output fibers (not shown) for achieving optical connectivity between the splitter module 38 and the feeder cable 16 and the distribution cables 20, respectively. The splitter module 42 includes a main body having an internal optical splitter (not shown) so that a multiplexed optical signal carried by the input cable 42 can be separated into multiple demultiplexed optical signals carried by the output cables 44. Optical splitters are generally well known in the industry and thus will not be further described herein.

The multiplexed optical signal typically comes from the switching point 12, to which the feeder cable 16 is coupled (FIG. 1). One end of the input cable 42 of the splitter module 38 may be terminated with a fiber optic connector 46 and plugged into the front side of the feeder cable adapters 32 in the feeder field 34 of the terminal 30, thereby establishing an optical connection with an optical fiber of the feeder cable 16. The other end of the input cable 42 may be coupled to the optical splitter in a known manner. The number of output fibers (and corresponding output cables 44) of the splitter module 38 depends on the split ratio (e.g., 1 input fiber and 8 output fibers for a 1×8 splitter, 1 input fiber and 16 output fibers for a 1×16 splitter, 1 input fiber and 32 output fibers for a 1×32 splitter, etc.). One end of the output cable 44 may be terminated with a fiber optic connector 48. Fiber optic connectors 48, 46, including the different sizes and types, are well known in the industry. Accordingly, such connectors will not be further described herein. The other end of the output cables 44 may be coupled to the optical splitter in a known manner.

Output cables 44 that are "live" (i.e., used in the network to carry optical signals to and from end subscribers) are plugged into the front side of fiber optic adapters 32 in a distribution field 50 (referred to as "distribution panel adapters"). There are typically several or many rows of distribution panel adapters 32 defining the distribution field 50. These adapters 32 are used to establish optical connections with optical fibers of one or more distribution cables 20 that exit the terminal 30 and carry optical signals further into the network 10 to ultimately reach end subscribers, such as residential subscribers, for example. Conventionally, the output cables 44 that are not used for live network traffic, and instead are reserved for future subscribers, are routed to a storage location 52 (also referred to as a parking field 52). FIG. 2 illustrates four output cables 44 terminated with respective fiber optic connectors 48 that are held within a parking device 54. The parking device 54 may be mounted to a door panel 56 of the frame 28 of the terminal 30.

In accordance with an aspect of the disclosure, the second module 40 may be a bypass module configured to bypass the signal-splitting process and provide a signal from an optical fiber of the feeder cable 16 to a corresponding optical fiber of a distribution cable 20 without splitting or other significant modifications. The bypass module 40 may include one or more input cables 60 and one or more output cables 62 for interfacing with the feeder cable 16 and distribution cables 20, respectively. The input cables 60 each carry an input fiber (not shown) and the output cables 62 each carry an output fiber (not shown) for providing transmission of an optical signal. One end of the input cable 60 may be terminated with a fiber optic connector (not shown) and plugged into the front side of a feeder cable adapter 32 in the feeder field 34, thereby establishing an optical connection with an optical fiber of the feeder cable 16. The other end of the input cable 60 may be terminated with a fiber optic connector 66 (FIG. 6) and coupled to the bypass module 40, as explained in more detail below. For each input cable 60 that is live, there is typically a corresponding output cable 62. One end of the output cable 62 may similarly be terminated with a fiber optic connector (not shown) and plugged into the front side of a distribution panel adapter 32 in the distribution field 50, thereby establishing optical connection with an optical fiber of a distribution cable 20. The other end of the output cable 62 may be terminated with a fiber optic connector 70 (FIG. 6) and coupled to the bypass module 40, as explained in more detail below.

In this way, there is a one-to-one correspondence between input and output cables 60, 62 and the incoming optical signal from an optical fiber of the feeder cable 16 is transmitted to an optical fiber of a distribution cable 20 without splitting or significant modifications of the incoming optical signal. In other words, the input cables 60 each optically couple to a single one of the output cables 62 of the bypass module 40. Therefore, the outgoing optical signal from the optical fiber of the distribution cable 20 is substantially the same as the incoming optical signal from the optical fiber of the feeder cable 16. The particular distribution cables 20 that are coupled to the bypass module 40 exit the terminal 30 and essentially carry the optical signals from the feeder cable 16 further into the network 10. These optical signals can then be split at a different location in the network 10 or be connected directly to subscribers without any splitting. Similar to the above, the output cables 62 that are not used for live network traffic, and instead are reserved for future connections, may be routed to the parking field 52 and held within the parking device 54 or within a dedicated parking device mounted to the door panel 56 of the frame 28 of the terminal 30 (not shown).

As one can readily appreciate from the above, the terminal 30 provides greater flexibility to network designers. For example, the terminal 30 may be configured to provide service to a first type of end subscriber by selecting a certain number of optical fibers from the feeder cable 16, as arranged in the feeder field 34, and routing the optical signal from those optical fibers through one or more splitter modules 38 arranged in respective slots 36 in the frame 28. Those incoming optical signals are then split into multiple output signals (e.g., 32 output signals) at the optical splitter and transmitted to respective optical fibers of the distribution cables 20, as arranged in the distribution field 50. Additionally or alternatively, the terminal 30 may be configured to provide a "pass through" of optical signals from the feeder cable 16 without splitting by selecting a certain number of optical fibers from the feeder cable 16 and routing the optical signal from those optical fibers through one or more bypass modules 40 arranged in respective slots 36 in the frame 28. Those incoming optical signals bypass the signal-splitting process and are transmitted to respective optical fibers of the distribution cables 20, as arranged in the distribution field 50. Thus, the inherent losses associated with the signal-splitting process can be avoided for these distribution cables 20 at this particular point in the network 10.

In one embodiment, the terminal 30 may include only splitter modules 38 should, for example, the terminal 30 be located in an environment where there are a sufficient number of end subscribers of the first type. In another embodiment, the terminal 30 may include only bypass modules 40. In still a further embodiment, the terminal 30 may be of a hybrid design having one or more splitter modules 38 and one or more bypass modules 40 within the same terminal 30. In this embodiment, network designers may accommodate multiple types and/or locations of end subscribers. The ability for the terminal 30 to accommodate different network architectures is considered highly beneficial for network designs, especially as optical fiber environments become more diverse and the demand for bandwidth further increases.

FIGS. 3-7 illustrate a bypass module 40 in accordance with an embodiment of the disclosure. The bypass module 40 includes a frame 80 having a main body 82 and a handle 84 movably coupled to the main body 82. As discussed above and illustrated more completely in FIGS. 6 and 7, the bypass module 40 is configured to receive one or more input cables 60 for optically coupling the bypass module 40 to the optical fibers of the feeder cable 16 and configured to receive one or more output cables 62 for optically coupling the bypass module 40 to the optical fibers of the distribution cables 20. The optical connection between respective input cables 60 and output cables 62 occurs at the bypass module 40 and the optical signal carried by the optical fibers of the feeder cable 16 is transmitted to respective optical fibers of the distribution cables 20 as explained above. As illustrated in FIG. 2, the bypass module 40 is sized similar to a splitter module 38 so that the bypass module 40 may be received in the slots 36 in the frame 28 of the terminal 30 in a manner similar to that of the splitter module 38. This allows either a splitter module 38 or a bypass module 40 to fit within each of the slots 36 in the frame 28 in an exchangeable manner.

Figure 3:
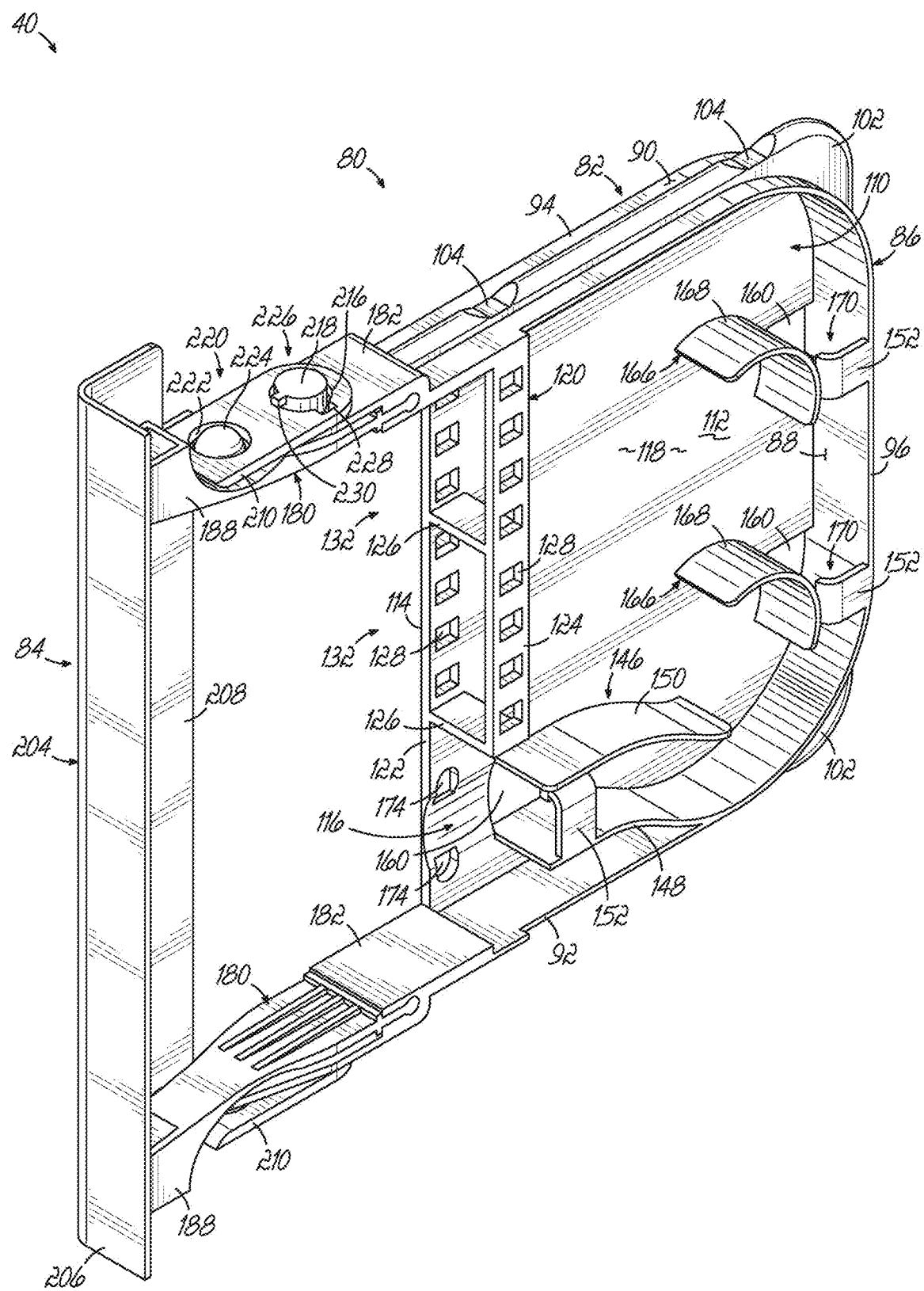
FIG. 3 is a perspective view of a bypass module in accordance with one embodiment of the disclosure.
Figure 4:
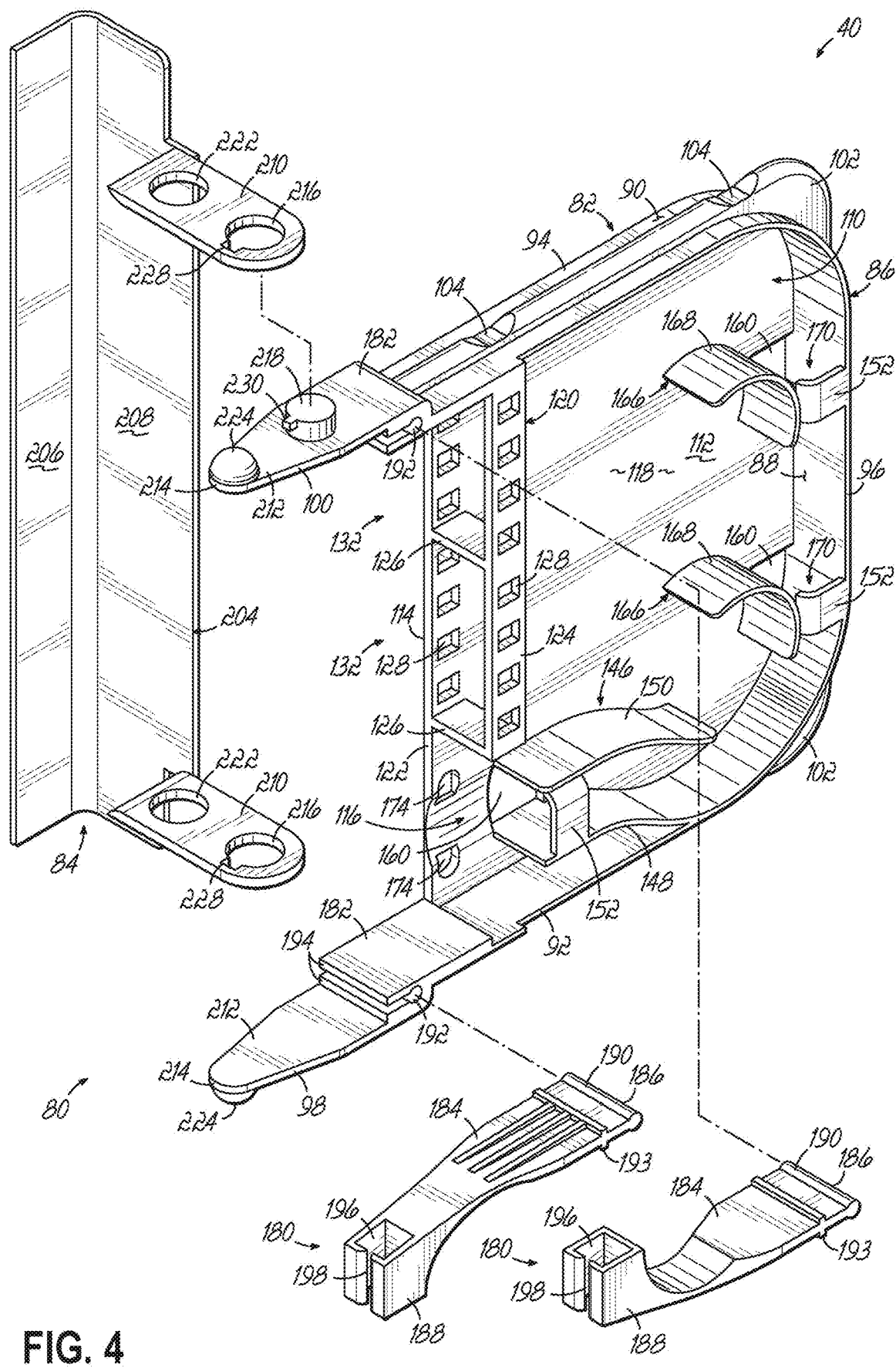
FIG. 4 is a disassembled perspective view of the bypass module illustrated in FIG. 3.

The bypass module 40 includes several features that provide enhanced organization of the potentially numerous input and output cables 60, 62, or support to the cables 60, 62 so as to provide a secure optical connection between respective input and output cables 60, 62, and to minimize damage to the cables 60, 62 inside the module 40 during use. To this end and as best illustrated in FIGS. 3 and 4, the main body 82 includes a U-shaped wall 86 having an inner surface 88 and an opposing outer surface 90. The wall 86 generally defines first and second opposed legs 92, 94 coupled at one end thereof by a cross leg 96 and extending to respective free ends 98, 100 (FIG. 4). The outer surface of the wall 86 includes a thin-walled flange 102 that may facilitate handling of the module 40 and may facilitate coupling of the module 40 within a slot 36 of the frame 28. For example, a portion of the flange 102 that extends along at least one, and preferably each, of the legs 92, 94 may include one or more recesses 104 (two shown). The recesses 104 may be configured to cooperate with one or more respective projections, tabs, etc. (not shown) associated with the slots 36 to retain or lock the bypass module 40 within one of the slots 36.

The main body 82 includes a floor or base panel 110 that has several cable-engaging features and provides a location at which the input cables 60 and output cables 62 may be optically coupled together. In one embodiment, the base panel 110 may be generally solid (e.g., less than 15% void space by area) and include an inner surface 112 and an outer surface 114. The base panel 110 may extend between the legs 92, 94 along a portion of the length of the legs 92, 94 and further extend to the cross leg 96. For example, the base panel 110 may extend between about 30% to about 70% of the length of the legs 92, 94 from the cross leg 96. Moreover, the base panel 110 may couple to the legs 92, 94 and cross leg 96 along a lower edge of the wall 86 to define a cavity 118 at least partially bounded by the base panel 110 and portions of the wall 86. Other arrangements of the base panel 110, however, may be possible. For example, in alternative embodiments the base panel 110 may not be solid (e.g., take the form of a mesh or other non-solid configuration) and the length of the base panel 110 along the legs 92, 94 may differ from the range provided above. Additionally, the base panel 110 may couple to the wall 86 away from the lower edge of the wall 86. Such alternative arrangements remain within the scope of the present disclosure.

Figure 5:
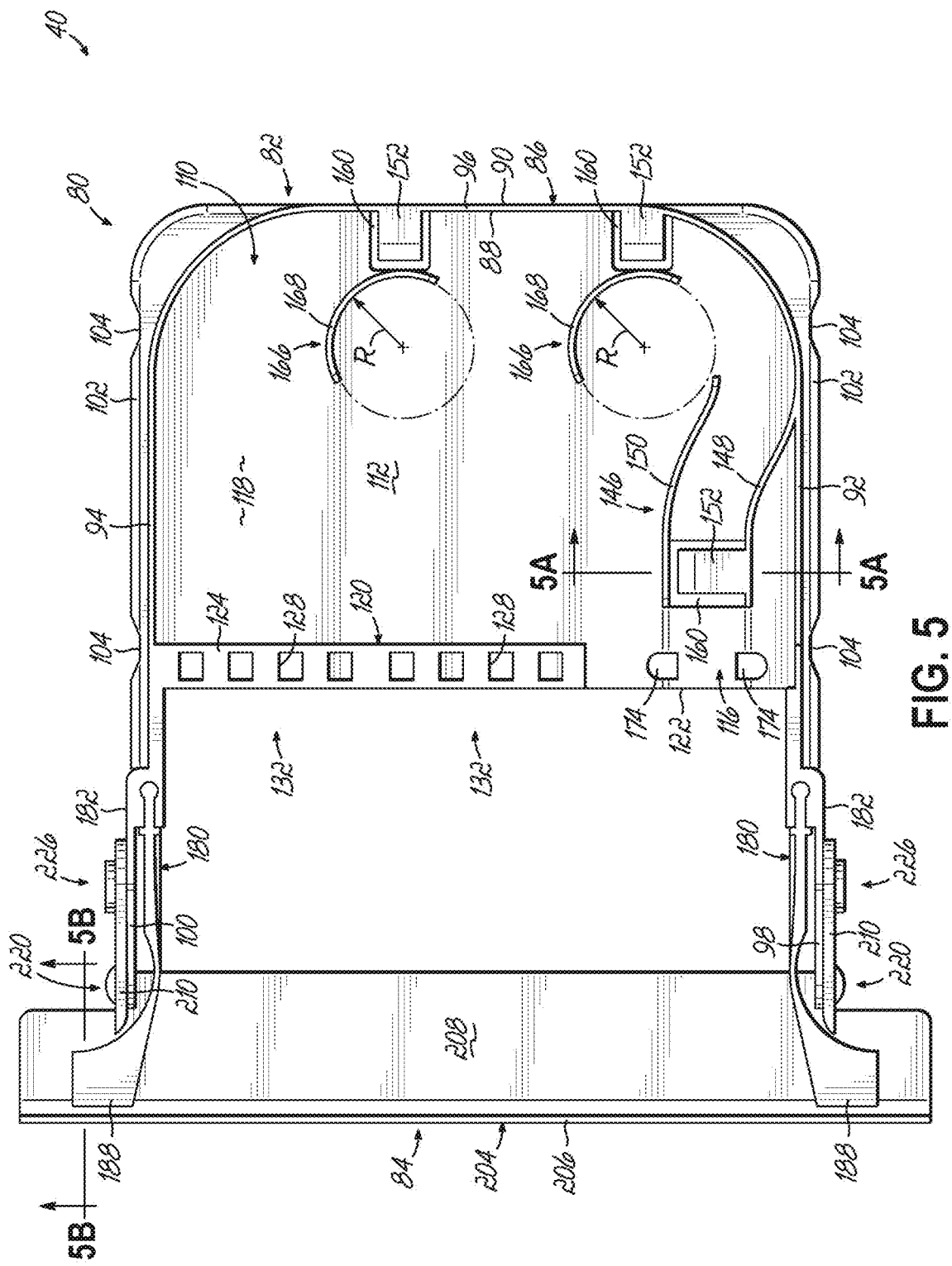
FIG. 5 is a top plan view of the bypass module illustrated in FIG. 3.

As illustrated in FIGS. 3-5, positioned on the inner surface 112 of the base panel 110 and within the cavity 118 is an adapter frame 120. In one embodiment, the adapter frame 120 may be positioned at or adjacent a forward edge 122 of the base panel 110 and extend from one of the legs 94 toward the opposing leg 92, but leaving a base opening 116 between the adapter frame and the opposing leg 92. However, other positions of the adapter frame 120 on the base panel 110 may be possible. The adapter frame 120 includes a top wall 124 and one or more struts 126 extending between the top wall 124 and the base panel 110. The top wall 124 and base panel 110 directly beneath the top wall 124 include aligned pairs of openings 128 configured to receive one or more optical adapters 130 therein (see FIGS. 6 and 7). In one embodiment, the openings 128 may be generally square or rectangular, but other shapes are possible. The one or more struts 126 may be positioned so as to define adapter groups 132. Each adapter group 132 may be configured to include between one and six adapters 130. In an exemplary embodiment and as illustrated in the figures, each adapter group 132 may include four adapters 130. The number of adapters 130 in an adapter group 132 may be dictated at least in part by minimizing damage to the input cables 60, as will be explained in more detail below.

Figure 6:
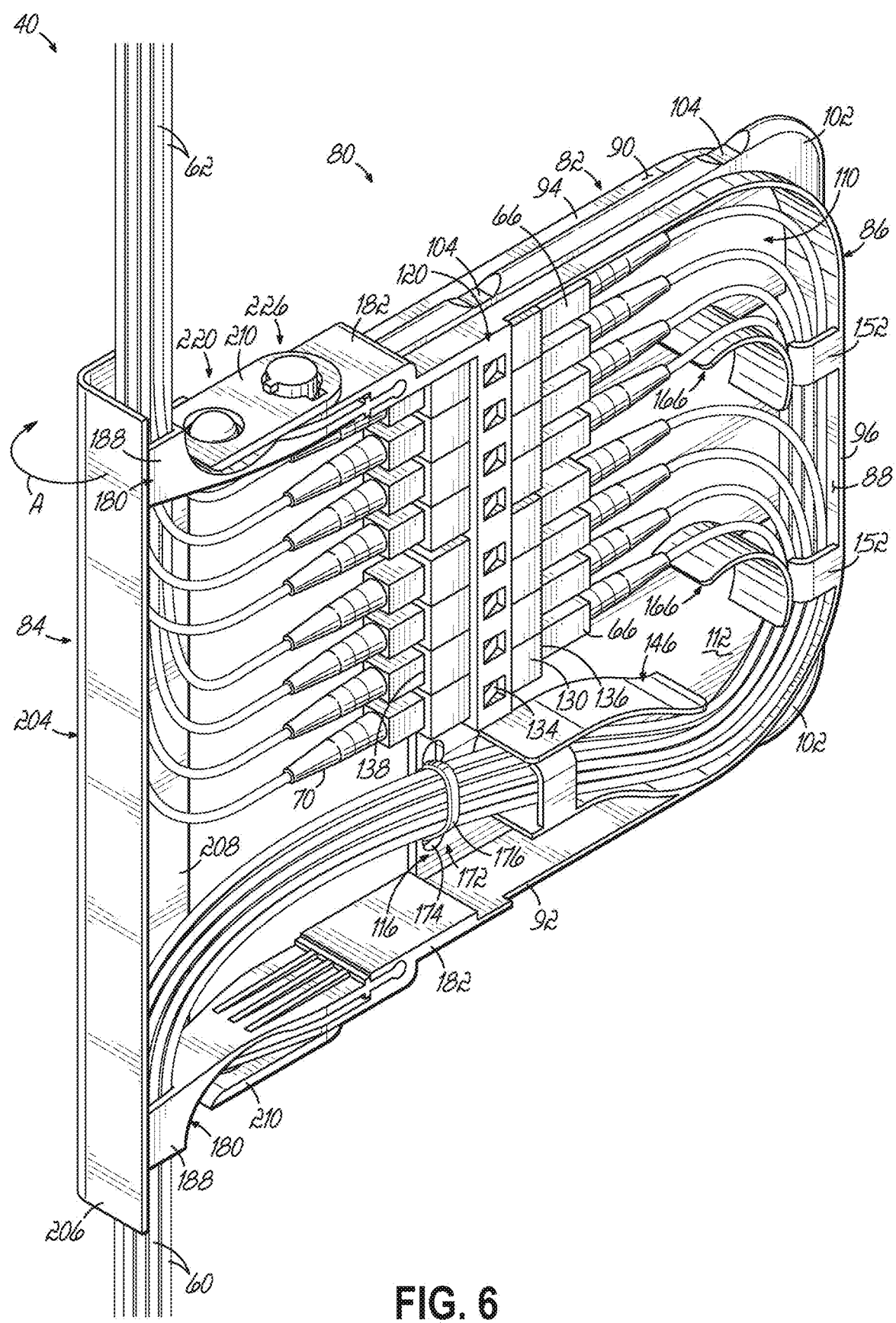
FIG. 6 is a perspective view of the bypass module illustrated in FIG. 3 having a plurality of input and output cables and with the handle in the closed position.
Figure 7:
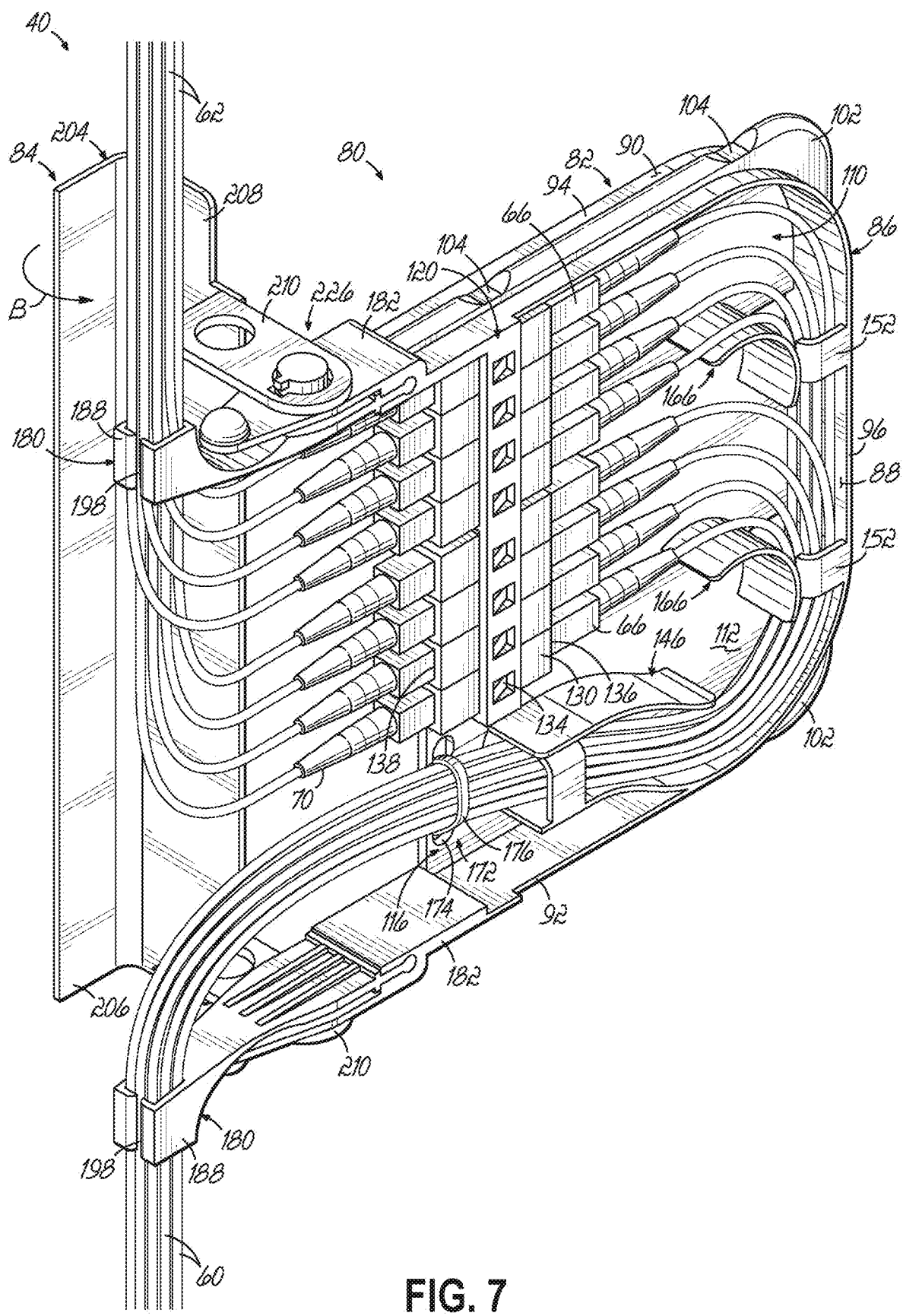
FIG. 7 is a perspective view of the bypass module shown in FIG. 6 but with the handle in the opened position.

As illustrated in FIGS. 6 and 7, the adapters 130 include tabs 134 configured to be received within the openings 128 in the adapter frame 120 to secure the adapters 130 to the adapter frame 120 and to the bypass module 40. An inner end of the one or more adapters 130 may include one or more input ports 136 configured to couple to the optical fiber connector 66 that terminates an input cable 60. An outer end of the one or more adapters 130 may include one or more output ports 138 configured to coupe to the optical fiber connector 70 that terminates an output cable 62. Thus, the adapter frame 120 provides for coupling of the adapters 130 to the module 40, and the adapters 130 provide an optical connection between the optical fiber of an input cable 60 and the optical fiber of an output cable 62. As such adapters 130 are generally well known in the art, a further description will not be provided herein. It should be recognized, however, that a wide variety of adapters may be used with the bypass module 40, including a single adapter with a plurality of input ports and output ports, or a plurality of adapters each having one or more input port and one or more output port. For example, as shown, each adapter 130 may include a single input port 136 and a single output port 138.

In accordance with the disclosure, the main body 82 further includes a plurality of cable guides for organizing and guiding the input cables 60 and/or output cables 62. For example, the base panel 110 may include one or more cable guides for guiding the input cables 60 from the base inlet 116 to the input ports 136 on the inner side of the adapters 130 in a manner that minimizes damage to the input cables 60. In one embodiment, the main body 82 of the bypass module 40, and more particularly the base panel 110, may include a cable guide in the form of a guide channel 146 configured to receive one or more input cables 60 and guide those cables through a smooth change in direction. The guide channel 146 includes a pair of generally opposed walls 148, 150 extending from the base panel 110 adjacent the leg 92 of the U-shaped wall 86. Each of the walls 148, 150 of the guide channel 146 has a first end adjacent but spaced from the base inlet 116 at the forward edge 122 of the base panel 110 and extending rearwardly therefrom. In one embodiment, the walls 148, 150 may not be straight but have a slight curve so as to smoothly direct the cables 60 positioned therein toward the leg 92 of the U-shaped wall 86. One of the walls 148 of the guide channel 146 may have a second end that intersects with the U-shaped wall 86 along leg 92 or along an arcuate transition between leg 92 and cross leg 96, for example. The second end of the other wall 150, however, may be spaced from the U-shaped wall 86 to provide a channel outlet for the one or more input cables 60 positioned therein.

As illustrated in the figures, the guide channel 146 may further include one or more retaining tabs 152 (one shown) that facilitate insertion of the cables 60 into the guide channel 146 and retention of the cables 60 within the channel 146. As illustrated in FIG. 5A, the one or more retaining tabs 152 may be generally J-shaped members positioned adjacent an upper edge of one of the guide channel walls 148, 150 (e.g., wall 148) and includes a first leg 154 extending from the wall 148 and a second leg 156 that extends into the region between the walls 148, 150 toward the base panel 110. The second leg 156 may be positioned adjacent the opposed wall 150 to provide an inlet gap 158 sized to be about equal to the diameter of the one or more input cables 60 being positioned in the guide channel 146. For example, the inlet gap 158 may be slightly smaller than the diameter of the input cables 60 such that the retaining tab 152 has to slightly deflect downwardly to allow a cable 60 to be inserted into the guide channel 146. The retaining tab 152 may be arcuate adjacent the second leg 156 to facilitate the insertion of the one or more input cables 60 therein. This arrangement essentially provides a one-way gate that allows the cables 60 to be inserted into the guide channel 146 but restricts movement of the cables 60 out of the guide channel 146. Additionally, the base panel 110 may include an opening 160 directly beneath the retaining tab 152. This feature, however, may be a result of the particular process used to make the main body 82 of the bypass module 40, such as a molding process. In alternate embodiments, the opening 160 may be omitted.

In addition to the guide channel 146, the main body 82 may include additional cable guides in the form of one or more cable supports 166 (two shown) configured to support one or more input cables 60 so as to limit deformation of the input cables 60 from excessive bends, kinks, etc. Each cable support 166 includes a generally arcuate wall 168 extending from the base panel 110 adjacent the cross leg 96 of the U-shaped wall 86. Each of the arcuate walls 168 has a first end adjacent but spaced from the cross leg 96 and a second end positioned more toward the forward edge 122 of the base panel 110. Additionally, the arcuate walls 168 may be longitudinally spaced from but generally aligned relative to the adapter frame 120. The space between the arcuate wall 168 adjacent the first end and the cross leg 96 of the U-shaped wall 86 provides a channel 170 configured to receive one or more input cables 60 therein (see FIGS. 3 and 4). In exemplary embodiments, the arcuate walls 168 of the cable supports 166 may have a radius of curvature R between about 2 cm and about 4 cm. In an exemplary embodiment, the arcuate walls 168 may have a radius of curvature of about 2.5 cm. Other values, however, may be possible depending of several factors, including the size and type of cable and the number of cables being carried by the bypass module 40.

In one embodiment, the number of cable supports 166 in the bypass module 40 may depend of the number of cables the module is configured to accommodate. More particularly, each cable support 166 may be configured to support only a certain number of cables. For example, to effectively limit unwanted deformations of the cables, each cable support 166 may be configured to support between 1 and 6 cables, and preferably is configured to support 4 cables, as illustrated in the figures. Thus, for example, if the bypass module 40 is configured to carry 8 cables (e.g., the adapter frame 120 is sized to receive 8 adapters), then the module 40 will include two cable supports 166. In one embodiment, there may be a cable support 166 for each adapter group 132 included in the adapter frame 120, as illustrated in FIGS. 3 and 5, for example.

Furthermore, each of the cable supports 166 may further include one or more retaining tabs 152 (one shown for each cable support 166) that facilitate insertion of the cables 60 into the channels 170 and retention of the cables 60 within the channels 170. Each retaining tab 152 may be similar to that described above and include a first leg 154 extending from the wall 86 of the cross leg 96 and a second leg 156 that extends into the region between the arcuate walls 168 and cross leg 96 toward the base panel 110. The second leg 156 may be positioned adjacent the arcuate walls 168 to provide an inlet gap 158 sized to be about equal to the diameter of the one or more input cables 60 being positioned in the channels 170. For example, the inlet gap 158 may be slightly smaller than the diameter of the input cables 60 such that the retaining tab 152 has to slightly deflect downwardly to allow a cable 60 to be inserted into the channels 170. The retaining tab 152 may be arcuate adjacent the second leg 156 to facilitate the insertion of the one or more input cables 60 therein. This arrangement essentially provides a one-way gate that allows the cables 60 to be inserted into the channels 170 but restricts movement of the cables 60 out of the channels 170. Additionally, the base panel 110 may include an opening 160 directly beneath the retaining tabs 152, which as noted above may be a result of the particular process used to make the main body 82 of the bypass module. In alternate embodiments, the openings 160 may be omitted.

In one embodiment, the bypass module 40 may include additional features to minimize damage to the cables associated with the module. For example, the bypass module 40 may include one or more strain-relief device to minimize damage to the cables in the module based on manipulations of the cables outside of the module 40. By way of example, during installment, maintenance, repair, etc. of a terminal 30 in the network 10, the input cables 60 might be pulled or otherwise manipulated outside of an installed module 40 in the terminal 30. In those cases, limiting the impact of those manipulations on the cables inside of the module 40 may be desirable.

In one embodiment, the strain relief device may include a cable cinch 172 configured to tightly secure the input cables 60 to the main body 82 of the bypass module 40. In an exemplary embodiment, the cable cinch 172 includes a pair of spaced-apart openings 174 in the base panel 110 and a cinch tie 176 (e.g., a zip tie, twist tie, wire, string, etc.) configured to extend through the openings 174 and be disposed about the input cables 60, as illustrated in FIGS. 6 and 7. The cable cinch 172 may be positioned to minimize the transmission of the strains on the input cables 60 external to the module 40 to the portion of the input cables 60 internal to the module 40. In one embodiment, for example, the cable cinch 172 may be positioned adjacent the base inlet 116 at the front edge 122 of the base panel 110 and adjacent the first end of the guide channel 146. Other positions, however, may also be possible. Moreover, other types of ties, clamps, etc. may be used as a strain relief device.

In addition to the above, the main body 82 of the bypass module 40 may include additional cable guides adjacent the free ends 98, 100 of the legs 92, 94. In an exemplary embodiment, the first contact of the input cables 60 with the bypass module 40 (e.g., from an external to internal direction) and the first contact of the output cables 62 with the bypass module 40 (e.g., from an external to internal direction) may occur at respective cable guides at the free ends 98, 100 of the main body 82. In one embodiment, the free ends 98, 100 of the legs 92, 94 include a guide tip 180 selectively mountable to a raised boss 182 of the U-shaped wall 86 along legs 92, 94. The raised boss 182, for example, may be formed by a thickened portion of the wall 86. In one embodiment, the guide tip 180 includes an elongate leg 184 having a first end 186 configured to be coupled to the main body 82 at the raised boss 182, and second end having an enlarged head 188 configured to receive the input and output cables 60, 62. In an exemplary embodiment, the guide tips 180 may be flexible and less rigid than the main body 82 (i.e., a lower Shore A hardness). For example, the guide tips 180 may be formed from a polymeric material, such as rubber, or other relatively compliant materials. This is in contrast, for example, to the material from which the main body 82 is formed, which may be a relatively rigid plastic. This flexibility of the guide tips 180 provides some level of movement of the cables 60, 62 while minimizing breakage or other damage to the bypass module 40 during use.

As illustrated in FIG. 4, the first end 186 of the elongate legs 184 includes an enlarged rounded ridge 190 configured to be received in a similarly shaped groove 192 formed in the raised boss 182. More particularly, the first end 186 of the elongate legs 182 may be slidably received in the grooves 192 and held therein through a friction fit. The generally softer material of the legs 184, which is different from the material that defines the grooves 192, may facilitate the friction fit. The elongate legs 184 may further include a shoulder 193 extending from each side of the legs 184 and configured to abut against end walls 194 defined in the raised bosses 182 when the guide tips 180 are coupled to the main body 82. Other means for selectively securing the guide tips 180 to the main body 82 may also be used, including various clips, gates, etc.

In one embodiment and as illustrated in FIGS. 4, 5B, and 7, the enlarged heads 188 may have a generally rectangular configuration that defines a channel 196 extending therethrough. The channel 196 through the heads 188 may extend in a direction generally transverse to the elongate legs 182. For example, the channels 196 may extend in a direction substantially perpendicular to the elongate legs 182 of the guide tips 180. The input and output cables 60, 62 extend from an external side of the bypass module 40 to an internal side of the module via a channel 196 in a respective head 188. Additionally, each of the heads 188 includes a slot 198 in a side wall thereof (e.g., such as an outer-facing wall) that facilitates insertion of the cables 60, 62 into the channels 196 and retention of the cables 60, 62 within the channels 196. In one embodiment, the slots 198 may be slightly smaller than the diameter of the cables 60, 62 such that portions of the heads 188 have to slightly deflect inwardly to allow a cable to be inserted into the channels 196. The heads 188 adjacent the slots 198 may include a taper or chamfer to facilitate the insertion of cables into the channels 196. This arrangement essentially provides a one-way gate that allows the cables 60, 62 to be inserted into the channels 196 but restricts movement of the cables 60, 62 out of the channels 196.

The handle 84 is configured to facilitate handling of the bypass module 40. The handle 84 may additionally provide some protection to the cables 60, 62 as well as to the adapters 130 and connectors 66, 70 inside of the bypass module 40. In an exemplary embodiment, the handle 84 includes an elongate L-shaped member 204 having a first leg 206 and a second leg 208, and a pair of arms 210 that extend from an inner surface of the second leg 208 adjacent opposed ends of the handle 84. The arms 210 generally extend in the same direction as the second leg 208 away from the first leg 206 and facilitate pivotable connection of the handle 84 to the main body 82 of the bypass module 40.

The handle 84 is configured to couple to the free ends 98, 100 of the legs 92, 94 of the main body 82. More particularly, the free ends 98, 100 include an extension flange 212 having a first end coupled to the raised bosses 182 and a second end terminating in a generally tapered and rounded tip 214 (see FIG. 4). The extension flanges 212 are generally outboard of the groove 192 formed in the raised bosses 182. Thus, when the guide tips 180 are coupled to the main body 82 of the bypass module 40, the legs 184 of the guide tips 180 are inboard of the extension flanges 212. The enlarged heads 188, however, may extend longitudinally beyond the tips 214 of the extension flanges 212 and further may extend laterally or outboard of the extension flanges 212, as illustrated in FIGS. 5 and 7, for example.

The handle 84 is pivotally moveable between a closed position, as illustrated in FIG. 6, and an opened position, as illustrated in FIG. 7. In the closed position, the legs 206, 208 cover or overlie two sides of the heads 188 of the guide tips 180. For example, in the closed position the first leg 206 may generally overlie the side wall of the heads 180 having the insertion slot 198 therein. This protects the guide tips 180 and prevents cables 60, 62 from being inserted into or removed from the channels 196. Moreover, in the closed position the handle 84 blocks off a pathway to the adapters 130 positioned in the adapter frame 120. In the opened position, however, the handle 84 is moved away from the heads 188 to provide access to the slots 198 in the heads 188 for positioning cables 60, 62 in the channels 196. Moreover, in the opened position a clear pathway is provided to the outer end of the adapters 130, thus facilitating connection of an output cable 62 to the bypass module 40. To achieve pivotal movement of the handle 84, the arms 210 include a generally circular bore 216 and the extension flanges 212 include a generally cylindrical projection or post 218 on an outer surface of the flanges 212. The posts 218 are configured to extend through the bores 216 when the handle 84 is coupled to the main body 82 and the circular geometry allows the handle 84 to rotate between the opened and closed positions.

In one embodiment, the bypass module 40 may include a first locking mechanism, generally shown at 220, to restrict movement of the handle 84 away from at least the closed position. In this embodiment, for example, the first locking mechanism 220 may include a generally circular bore 222 in the arms 210 of the handle 84 and generally hemispherical projections or buttons 224 on the outer surface of the extension flanges 212. The buttons 224 may be positioned adjacent the tip 214 of the extension flanges 212. When the handle 84 is in the closed position, the buttons 224 on the extension flanges 212 are configured to be received in the bores 222 in the arms 210 of the handle 84, as illustrated in FIG. 6.

If one attempts to rotate the handle 84 away from the closed position, such as in the direction of arrow A shown in FIG. 6, the wall that defines the bores 222 engages a lower portion of the buttons 224 and thus restricts movement of the handle 84 away from the closed position. However, if a large enough force (referred to as a threshold force) is applied to the handle 84, the extension flanges 212 may slightly deflect inward toward each other so that the wall that defines the bores 222 rides up the arcuate surface of the buttons 224 and thereover. Once the bores 222 in the arms 210 of the handle 84 are free from the buttons 224, the handle 84 may be rotated further away from the closed position and toward the opened position without significant resistance.

Moreover, in one embodiment the bypass module 40 may further include a second locking mechanism, generally shown at 226, to restrict movement of the handle 84 away from the opened position. This will prevent, for example, the handle 84 from inadvertently moving away from the opened position during use of the bypass module 40. In this embodiment, the second locking mechanism 226 may include a keyway 228 in the generally circular bore 216 in the arms 210 of the handle 84, and a key 230 extending from the posts 218, and more particularly from a sidewall thereof. When the handle 84 is in the opened position, the keys 230 on the posts 218 are configured to be received in the keyways 228 in the bores 216 of the arms 210 of the handle 84, as illustrated in FIG. 7.

If one attempts to rotate the handle 84 away from the opened position, such as in the direction of arrow B shown in FIG. 7, the walls that define the keyways 228 engage the keys 230 and thus restrict movement of the handle 84 away from the opened position. To disengage the second locking mechanism 226, the handle 84 is first moved toward the tip 214 of the extension flanges 212 as a whole body (i.e., without rotation) until the keys 230 are disengaged or outside of the keyways 228. At this point, the handle 84 may be rotated away from the opened position and toward the closed position without significant resistance. As the handle 84 approaches the closed position, an outer edge of the arms 210 engages a lower portion of the buttons 224 and thus restricts movement of the handle 84 completely toward the closed position. However, if a threshold force is applied to the handle 84, the extension flanges 212 may slightly deflect inward toward each other so that the outer edge of the arms 210 rides up the arcuate surface of the buttons 224 and thereover so that the buttons 224 are positioned in the bores 216 in the arms 210 and the handle 84 is in the closed position.

While the first and second locking mechanisms 220, 226 are shown and described above as being associated with both arms 210 of the handle 84 and both legs 92, 94 of the main body 82. In an alternative embodiment, the locking mechanisms 220, 226 may be associated with only one arm 210 and corresponding leg 92, 94. In a further alternative embodiment, the first locking mechanism 220 may be associated with one of the arms 210 and corresponding leg 92, 94 and the second mechanism 226 may be associated with the other arm 210 and corresponding leg 92, 94. Thus, the locking mechanisms 220, 226 should not be limited to the specific arrangement described above.

In one embodiment, a terminal 30 may be configured for use in an optical fiber network 10 having a feeder cable 16 carrying feeder optical fibers and a plurality of distribution cables 20 carrying distribution optical fibers. In this embodiment, the terminal 30 may be configured to receive respective end sections of the feeder cable 16 and the plurality of distribution cables 20 when deployed in the field. Depending on the circumstances, it may be desirable to avoid splitting the incoming optical signal carried by one or more of the optical fibers of the feeder cable 16 at the terminal 30 and instead transmit those optical signals deeper into the network 10 via corresponding optical fibers in the distribution cables 20. The module 40 of the present disclosure provides such a bypass of the signal splitting process to achieve that result. Accordingly, in one embodiment, the terminal 30 may come pre-loaded with one or more bypass modules 40 in the terminal 30.

In this regard, one or more input cables 60 may be loaded into the bypass module 40. For example, the fiber optic connector 66 associated with the input cable 60 may be coupled to the input port 136 at the inner end of an adapter 130 positioned in the adapter frame 120 of the bypass module 40. Once coupled, the cable 60 may be routed along the channels 170 and 146 of the cable guides 144 associated with the bypass module 40. More particularly, a portion of the cable 60 may be inserted through the retention tabs 152 associated with the cable supports 166 and guide channel 146. The input cable 60 may then be inserted into the channel 196 associated with the head 188 of one of the guide tips 180 by inserting the input cable 60 through the slot 198 in the head 188. The guide tips 180 may be coupled to the main body 82 when the input cable 60 is inserted into the channel 196. Alternatively, the input cable 60 may be inserted into the channel 196 of the guide tip 180 while separated from the main body 82 and the guide tip 180 subsequently coupled to the main body 82 in the manner described above. This process may be repeated for the desired number of input cables 60.

In one embodiment, the bypass module 40 may be fully loaded with input cables 60 at initial set up, whether or not each input cable 60 is to be coupled to a feeder cable adapter 32 in the feeder field 34 and be live. Alternatively, only the number of input cables 60 intended to be used may be loaded into the bypass module 40. In this case, the module 40 is capable of further expansion at a later time and essentially operates on an as-needed basis. In any event, once all of the desired input cables 60 are loaded into the bypass module 40, the strain-relief device may be engaged. For example, the cinch tie 176 may be secured about the input cables 60.

As described above, for each active input cable 60, there is a corresponding output cable 62 that is loaded into the bypass module 40. For example, the fiber optic connector 70 associated with the output cable 62 may be coupled to the output port 138 at the outer end of a corresponding adapter 130 positioned in the adapter frame 120 of the bypass module 40. Once coupled, the output cable 62 may be inserted into the channel 196 associated with the head 188 of the other guide tip 180 by inserting the cable 62 through the slot 198 in the head 188. The guide tip 180 may be coupled to the main body 82 when the input cable 62 is inserted into the channel 196. Alternatively, the output cable 62 may be inserted into the channel 196 of the guide tip 180 while separated from the main body 82 and the guide tip 180 subsequently coupled to the main body 82 in the manner described above. This process may be repeated for the desired number of output cables 62.

In one embodiment, the bypass module 40 may be fully loaded with output cables 62 at initial setup, whether or not each output cable 62 is to be live and coupled to a distribution panel adapter 32 in the distribution field 50. Alternatively, only the number of output cables 62 intended to be used may be loaded into the bypass module 40. In this case, the module 40 is capable of further expansion at a later time and essentially operates on an as-needed basis.

After the desired number of input cables 60 are loaded into the bypass module 40, the module 40 may be inserted into one of the slots 36 and secured within the frame 28 of the terminal 30. In this embodiment, the output cables 62 may be coupled to an adapter 130 in the adapter frame 120 by moving the handle 84 to the opened position and accessing the appropriate adapter 130 with the connector 70 of the output cable 62. In an alternative embodiment, however, both the input cables 60 and output cables 62 may be loaded into the bypass module 40 before the module 40 is positioned into a slot 36 in the frame 28. It should be recognized that in one embodiment the bypass module 40 is configured to have additional output cables 62 couple to the module 40 without having to remove the module 40 from the frame 28 of the terminal 30. However, should one want to have additional input cables 60 couple to the module 40, the module 40 will first have to be removed from the frame 28 of the terminal 30 before doing so. This may be a reason to at least fully load the bypass module 40 with input cables 60 at initial set up. Any non-active input cables 60 and output cables 62 may be directed to a parking location similar to that described above for the splitter modules 38 and subsequently coupled to the feeder field 34 and distribution field 50 when desired.

In a further embodiment, the bypass module 40 may be inserted into a terminal 30 that is already in operation in the optical fiber network 10. In this embodiment, the feeder cable 16 has an end section extending into the terminal 30 and includes a plurality of feeder optical fibers each having an end secured in one of the feeder cable adapters 32 in the feeder field 34. Similarly, the plurality of distribution cables 20 have respective end sections extending into the terminal 30 and each of the distribution cables 20 includes at least one optical fiber having an end section secured in a respective one of the distribution panel adapters 32 in the distribution field 50. In this embodiment, a service technician, or other personnel, will insert one or more bypass modules 40 into the terminal 30 that is deployed in the field.

As described above, the bypass module 40 may include one or more input cables 60 extending from one or more input ports 136 on the one or more bypass adapters 130 in the bypass module 40. In one embodiment, for example, the bypass module 40 will come fully loaded with a plurality of input cables 60. The service technician will then couple an end of one or more of the input cables 60 to a respective one of the feeder cable adapters 32 in the feeder field 34. In one embodiment, the bypass module 40 may not initially be provided with output cables 62. In this embodiment, the service technician would then take an output cable 62 and couple one end of the cable 62 to an output port 138 on the second side of the bypass adapters 130. This might be achieved, for example, by moving the handle 84 to the opened position so as to provide access to the output ports 138 of the adapters 130. The other end of the output cable 62 would then be coupled to a distribution panel adapter 32 in the distribution field 50. This process can be repeated for the desired number of output cables 62. Subsequently, the handle 84 may be moved to a closed position. In an alternative embodiment, the bypass module 40 may come fully loaded with output cables 62 and only the desired number of output cables 62 coupled to distribution panel adapters 32 in the distribution field 50.

Based on the above, it should be recognized that one or more bypass modules 40 may be incorporated into a terminal 30 in both a factory setting or in a field setting. In either setting, in an exemplary embodiment the one or more bypass modules 40 may be provided fully loaded with input cables 60. In one embodiment, the one or more bypass modules 40 may also come fully loaded with output cables 60. In an alternative embodiment, however, the output cables 62 may be added to the one or more bypass modules 40 on an as-needed basis. It should be further recognized that the terminal 30, either from the factory setting or field setting, may also include one or more splitter modules 38, thus forming a hybrid type of terminal.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A terminal for an optical fiber network that includes a feeder cable carrying feeder optical fibers and a plurality of distribution cables carrying distribution optical fibers, the terminal comprising:
- a housing configured to receive respective end sections of the feeder cable and the plurality of distribution cables;
- a plurality of feeder cable adapters positioned in the housing for securing ends of the feeder optical fibers;
- a plurality of distribution panel adapters positioned in the housing for securing ends of the distribution optical fibers;
- a bypass module positioned in the housing, wherein the bypass module includes a main body and at least one bypass module adapter secured to the main body, and wherein the at least one bypass module adapter defines a first side having at least one input port and a second side having at least one output port;
- a plurality of input optical fibers extending from at least one of the plurality of feeder cable adapters, into the main body of the bypass module, and to the at least one input port on the first side of the at least one bypass module adapter; and
- a plurality of output optical fibers extending from the at least one output port on the second side of the at least one bypass module adapter to at least one of the plurality of distribution panel adapters,
- wherein the plurality of input optical fibers each optically couple to a single one of the plurality of output optical fibers within the at least one bypass module adapter.

2. The terminal of claim 1, wherein the first side of the at least one bypass module adapter has a plurality of input ports and the second side of the at least one bypass module adapter has a corresponding plurality of output ports, wherein the plurality of input optical fibers each extend to a respective one of the plurality of input ports, and wherein the plurality of output optical fibers each extend from a respective one of the plurality of output ports.

3. The terminal of claim 2, further comprising:
- a plurality of input cables that each carry one of the plurality of input optical fibers, wherein each of the plurality of input cables includes a first end secured to one of the plurality of input ports of the at least one bypass module adapter and a second end secured to one of the plurality of feeder cable adapters; and
- a plurality of output cables that each carry one of the plurality of output optical fibers, wherein each of the plurality of output cables includes a first end secured to one of the plurality of output ports of the at least one bypass module adapter and a second end secured to one of the plurality of distribution panel adapters.

4. The terminal of claim 1, wherein the bypass module further comprises an adapter frame for securing the at least one bypass module adapter to the main body of the bypass module.

5. The terminal of claim 1, wherein the bypass module further comprises at least one cable guide for arranging the plurality of input optical fibers or the plurality of optical fibers on the main body of the bypass module.

6. The terminal of claim 5, wherein the at least one cable guide includes a guide channel receiving the plurality of input optical fibers, the guide channel having a pair of opposed walls that define the channel, and wherein the pair of opposed walls of the guide channel are arcuate to facilitate a smooth change in direction of the plurality of input optical fibers.

7. The terminal of claim 6, wherein the bypass module further comprises a retaining tab for retaining the plurality of input optical fibers in the guide channel.

8. The terminal of claim 5, wherein the at least one cable guide includes one or more cable supports for supporting the plurality of input optical fibers, each of the one or more cable supports including an arcuate wall to facilitate a smooth change in direction of the plurality of input optical fibers.

9. The terminal of claim 8, wherein the one or more cable supports is positioned on the main body to at least partially define a cable support channel for receiving one or more of the plurality of input optical fibers, and wherein the bypass module further comprises a retaining tab for retaining the one or more of the plurality of input optical fibers in the cable support channel.

10. The terminal of claim 8, wherein the bypass module further comprises an adapter frame for securing the at least one bypass module adapter to the main body of the bypass module, wherein the adapter frame defines one or more adapter groups, and wherein there is a cable support for each adapter group in the adapter frame.

11. The terminal of claim 10, wherein each adapter group is configured to include between 1-6 bypass module adapters.

12. The terminal of claim 5, wherein the at least one cable guide includes a pair of guide tips for guiding the plurality of input optical fibers and the plurality of output optical fibers, each guide tip including a leg and a head that defines a head channel.

13. The terminal of claim 12, wherein the guide tips are selectively mountable on the main body of the bypass module.

14. The terminal of claim 1, wherein the bypass module further comprises a handle movable between an opened position and a closed position, and wherein:
- when the handle is in the opened position, an access path is provided for accessing the at least one output port of the at least one bypass module adapter; and
- when the handle is in the closed position, the access path to the at least one output port of the at least one bypass module adapter is blocked off.

15. The terminal of claim 14, wherein the bypass module further comprising at least one locking mechanism for securing the handle in the opened position or the closed position.

16. The terminal of claim 15, wherein the bypass module includes two locking mechanism for securing the handle in the opened position and the closed position.

17. A terminal for an optical fiber network, comprising:
- a housing;
- a plurality of feeder cable adapters positioned in the housing;
- a feeder cable having an end section extending into the housing, wherein the feeder cable includes a plurality of feeder optical fibers each having an end secured in one of the feeder cable adapters;
- a plurality of distribution panel adapters positioned in the housing;
- a plurality of distribution cables having respective end sections extending into the housing, wherein each of the distribution cables includes at least one distribution optical fiber having an end section secured in a respective one of the distribution panel adapters;
- a bypass module positioned in the housing, wherein the bypass module includes a main body and at least one bypass module adapter secured to the main body;

a plurality of input optical fibers extending from at least one of the feeder cable adapters, into the main body of the bypass module, and to respective input ports on a first side of the at least one bypass module adapter, wherein each of the input optical fibers is optically coupled to one of the feeder optical fibers in one or more of the feeder cable adapters; and a plurality of output optical fibers extending from respective output ports on a second side of the at least one bypass module adapter and to at least one of the distribution panel adapters, wherein the plurality of output optical fibers each optically couple to: (a) a respective one of the distribution optical fibers in one or more of the distribution panel adapters, and (b) to a respective one of the plurality of input optical fibers in the at least one bypass module adapter.

18. A bypass module for a terminal of an optical fiber network, comprising:

a main body defining a base having a base opening;

an adapter frame on the base and positioned adjacent the base opening;

at least one bypass module adapter coupled to the adapter frame and defining a first side having a plurality of input ports and a second side having a corresponding plurality of output ports;

at least one cable guide on the base; and a plurality of input optical fibers each extending through the base opening and being guided from the base opening to a respective one of the plurality of input ports on the first side of the at least one bypass module adapter by the at least one cable guide, wherein the plurality of input optical fibers each include an end secured in the at least one bypass module adapter, a plurality of output optical fibers each extending from a respective one of the output ports on the second side of the at least one bypass module adapter, wherein the plurality of input optical fibers each optically couple to a single one of the plurality of output optical fibers in the at least one bypass module adapter, wherein the at least one cable guide includes a guide channel receiving the plurality of input optical fibers, the guide channel having a pair of generally arcuate opposed walls that define the channel, and wherein the bypass module further comprises a retaining tab for retaining the plurality of input optical fibers in the guide channel.

19. The bypass module of claim 18, wherein the at least one cable guide includes one or more cable supports for supporting the plurality of input optical fibers, each of the one or more cable supports including an arcuate wall to facilitate a smooth change in direction of the plurality of input optical fibers, wherein the one or more cable supports is positioned on the base to at least partially define a cable support channel for receiving one or more of the plurality of input optical fibers, and wherein the bypass module further comprises a retaining tab for retaining the one or more of the plurality of input optical fibers in the cable support channel.

20. The bypass module of claim 19, wherein the adapter frame defines one or more adapter groups, and wherein there is a cable support for each adapter group in the adapter frame.

21. The bypass module of claim 18, further comprising a pair of generally flexible guide tips selectively mountable on the main body of the bypass module for guiding the plurality of input optical fibers and the plurality of output optical fibers, wherein each guide tip including a leg and a head that defines a head channel, and wherein the head of each guide tip includes a slot for providing access to the head channel.

22. The bypass module of claim 18, further comprising a handle movable between an opened position and a closed position, and wherein:

when the handle is in the opened position, an access path is provided for accessing the plurality of output ports of the at least one bypass module adapter; and when the handle is in the closed position, the access path to the plurality of output ports of the at least one bypass module adapter is blocked off.

* * * * *